United States Patent [19]

Sugimoto et al.

[11] 3,783,191

[45] Jan. 1, 1974

[54] OBJECTIVE LENS FOR TELEVISION CAMERAS

[75] Inventors: Noboru Sugimoto, Fujiidera; Shoichi Ohneda, Wakayama, both of Japan

[73] Assignee: Minolta Camera Kabushiki Kaisha, Osaka-shi, Japan

[22] Filed: Dec. 27, 1972

[21] Appl. No.: 318,945

[30] Foreign Application Priority Data

Dec. 28, 1971 Japan ............................ 46/122661

[52] U.S. Cl. .................. 178/7.92, 178/7.85, 350/8, 350/69, 350/252

[51] Int. Cl. ........................................ G02b 7/02

[58] Field of Search ............ 178/7.85, 7.92, 5.4 ST; 350/8, 69, 252, 319

[56] References Cited

UNITED STATES PATENTS 3,609,236 9/1971 Heilman ............................ 178/7.92

*Primary Examiner*—Howard W. Britton
*Attorney*—Stanley Wolder

[57] ABSTRACT

An objective lens for television cameras is provided wherein a bodytube supporting the objective lens and a shield case of the electrical system of the camera including the vidicon tube are maintained at the same potential when connected to each other for preventing disturbances on the received picture image caused by a potential discrepancy in the transmitting system. The objective lens has a mounting or coupling portion by way of which the lens is conductively mounted on the casing of the electric system of the television camera accommodating the vidicon tube. In order to improve conductivity in the connection between the mounting portion of the objective lens and the closest portion to the television camera of a movable member which supports the lenses, conduction surfaces are provided on the mounting portion and the closest portion to the television camera of the movable member and an electrically conductive member is interposed between the two conduction surfaces in constantly contacting relationship therewith for maintaining the closest portion to the television camera of the objective lens and the photoelectric surface of the vidicon at the same potential.

12 Claims, 8 Drawing Figures

OBJECTIVE LENS FOR TELEVISION CAMERAS

BACKGROUND OF THE INVENTION

This invention relates to an objective lens for a television camera, and more particularly to an objective lens for a television camera whereby the closest portion of the television camera of the objective lens and a shielding casing of the electric system accommodating a vidicon tube are maintained at the same potential when connected or coupled to each other for preventing a disturbance of the received picture image caused by a potential discrepancy in the transmitting system.

In general, a television camera has a vidicon and associated electrical parts accommodated or housed within a metal casing for electromagnetically and electrostatically shielding the contents. An objective lens is connected to the shield case by way of a mounting or coupling portion which is provided on the lens tube or barrel and maintained at the same potential as the metal casing.

The objective lens system usually consists of a mounting or coupling portion connectible to a counter or mating coupling or connection portion on the metal casing of the electric system of the camera, a bodytube composed of at least one tube for supporting a lens system and movable toward and away from the mounting portion by way of, for example, a helicoid, and an adjusting member for adjusting the movement of the bodytube. The connecting portion of the objective lens is fixed to the counter connecting portion of the casing in such a manner as to allow electrical conduction between said connecting portion of the casing and the closest portion to the television camera of the movable member.

However, the components of the objective lens except for those of the lenses are in most cases formed from aluminum or from a metal containing aluminum to meet various requirements such as workability, lightness, and dimensional accuracy. The surfaces of the aluminum or aluminum containing components are subjected to anodic oxidation treatment for protection purposes.

Due to this treatment, the component parts of the objective lens are placed in a condition insulated from each other. Such an objective lens, when mounted on the shield case, forms an impediment in the transmission system, resulting in disturbances in the received and reproduced picture image.

The shield case is provided with an aperture for passing therethrough the light rays incident from the objective lens on a photoelectric surface of the vidicon tube. When a metal strip which is electrically insulated from the shield casing is experimentally disposed closed to the aperture within a small angle of radiation extending from the photoelectric surface through the aperture, there occur disturbances in the horizontal scanning lines of the reproducing system receiving the video signals from the transmission system, in a very similar manner as when the picture image is disturbed by mounting an insulated objective lens on the shield case.

If the experimentally disposed metal strip is electrically connected to the shield case, the disturbance in the picture image on the reproducing system disappears.

This phenomenon is considered that the metal strip insulated from the shield case has an electrical capacity with regard to the photoelectric surface of the vidicon tube which forms a television camera within the case, and acts as a stray capacity which introduces an impediment to the electron beam scanning the photoelectric surface, from the cathode through a control grid, accelerating electrode, cylindrical electrode, and mesh electrode, as well as a focusing coil and deflection coil provided within the shield case, causing disturbance in the horizontal scanning lines of a Braun tube which receives signals transmitted from the signal output electrode of the vidicon tube.

In order to avoid this, it has been the conventional practice to remove the oxidation film from the connecting surfaces of the metallic component parts of the objective lens and to apply a conductive grease on the connecting parts as well as the moving parts associated therewith. This is unsatisfactory in that the film-removing process of the component parts involves high production costs and the application of the conductive grease results in high contact resistance between the metal parts which is not suitable for use in a vidicon of high sensitivity. Furthermore, the oil films of the grease undergo breakage due to degradation during use over a long period of time, and thus are not reliable.

SUMMARY OF THE INVENTION

The present invention aims at the elimination of the above noted defects. The primary object of the present invention is to provide an objective lens for a television camera which can prevent disturbance in the received picture image due to connection of the objective lens in the transmitting system.

Another object of the present invention is to provide an objective lens for a television camera, wherein the closest portion to the television camera of the objective lens to be mounted on the television camera is maintained at the same potential as the shield case of the camera.

Still another object of the present invention is to provide an objective lens for a television camera, whereby electrical conduction between the connecting portion of the objective lens for connecting the lens to the television camera and the metallic bodytube supporting the lenses may be assured in a reliable manner.

A further object of the present invention is to provide an objective lens for a television camera, wherein constant electrical conduction between the connecting portion of the objective lens for connecting the same to the television camera and the metallic bodytube supporting the lenses is attained by means of a resilient member of conductive metallic material.

DESCRIPTION OF THE PREFERRED EMBODIMENT

Figure 1:
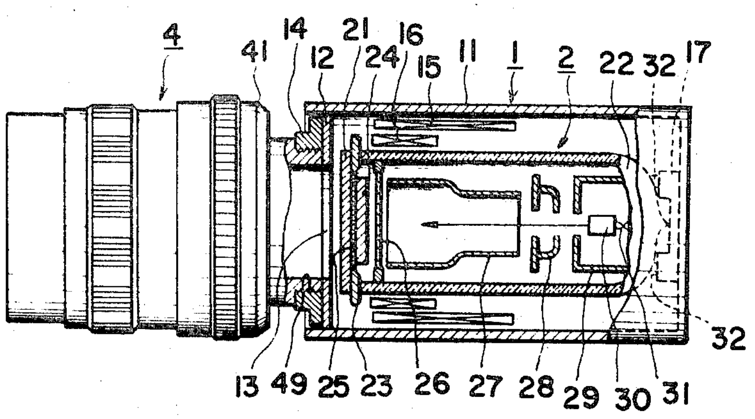
FIG. 1 is a partially sectioned side view of an objective lens according to the present invention mounted on a television camera.

Referring to FIG. 1, there is shown in a partially sectioned side view an objective lens according to the present invention, which objective lens is mounted on the television camera by way of the connecting portion thereof.

The television camera 1 is provided with a metallic casing 11 for accommodating and housing therein and shielding from the outer electromagnetic and electrostatic changes the electric parts which will be described herein after. The shield case 11 has at the fore end thereof a metallic front plate 12 for mounting the objective lens on the shield case 11. The front plate member 12 has secured conductively thereto a mounting receptacle or coupling portion 14 which is held in threaded engagement with a coupling mounting or connecting portion 49 formed at the rear end of a body-tube 41 of the objective lens 4. The contacting portions of the connecting portions 14 and 49 are formed so as to allow electrical conduction therebetween. In the example shown, the connecting portions are secured to each other by means of a threaded engagement; however, they may be connected by other forms of connection such as a bayonet joint.

The front plate 12 is formed with an aperture 13 for passing the light rays incident through the objective lens 4.

Figure 2:
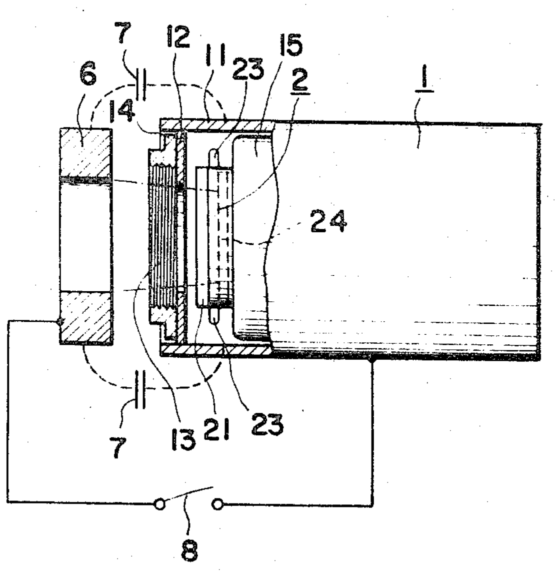
FIG. 2 is a diagrammatic view showing a metallic member forming an electric capacity which affects the photoelectric surface of the vidicon tube.
Figure 3:
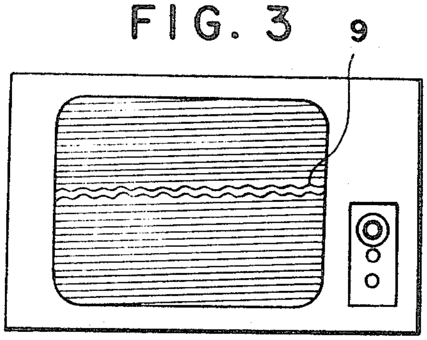
FIG. 3 is a front view of a television receiver showing on the screen thereof the disturbance in the horizontal scanning lines as would be caused by the television camera arrangement shown in FIG. 2.

The shield case 11 accommodates therein a vidicon tube 2 and other known electrical parts for operating the vidicon tube. The vidicon tube 2 is supported on the retaining portion 17 of the rear end wall of the shield case by means of pin members 32 which project rearwardly from a bulb or envelop 22 maintaining the vacuity of the vidicon tube. Designated at 21 is a transparent plate or sheet which is secured to the front end of the tube 22. There is shown at 23 a conductive nesa glass, at 23 an output signal electrode attached to the conductive nesa glass sheet, at 24 a photoelectric element formed in contact with the nesa glass sheet 25, at 26 a mesh electrode, at 27 a cylindrical electrode, at 28 an accelerating electrode, at 29 a control grid, at 30 a cathode, and at 31 a heater. The electrons emitted from he cathode 30 are formed into a beam travelling in the direction of the arrow by means of the focusing coil 15 and the deflection coil 16 which are provided outside the envelop 22, the electron beam scanning the photoelectric element 24. With the above television camera construction, if a metal ring 6 which is insulated with respect to the shield case 11 is disposed closed to the television camera within a radiation angle disposed from the photoelectric element surface 24 through the aperture 13 as shown in FIG. 2, there is formed a capacitor 7 between the photoelectric surface 24 and the metal ring 6. This influences the photoelectric surface 24 and introduces an impediment in the scanning by the electron beam, resulting in disturbance of the horizontal scanning lines in the picture image reproduced on the Braun or cathode ray picture tube 9, the disturbed horizontal scanning lines showing a wavy form with respect to the reference lines as shown in FIG. 3. Needless to say, this disturbance of the horizontal scanning lines causes a disturbance to the reproduced picture image. This phenomenon may be avoided by connecting the metal ring 6 to the shield case 11 through a switch 8. The disturbance of the horizontal scanning lines 9 as described hereinabove may be eliminated by closing the switch 8, since thereby the metal ring 6 and the shield case 11 are maintained at the same potential and the capacitor 7 is shorted and is no longer of any effect.

Figure 4:
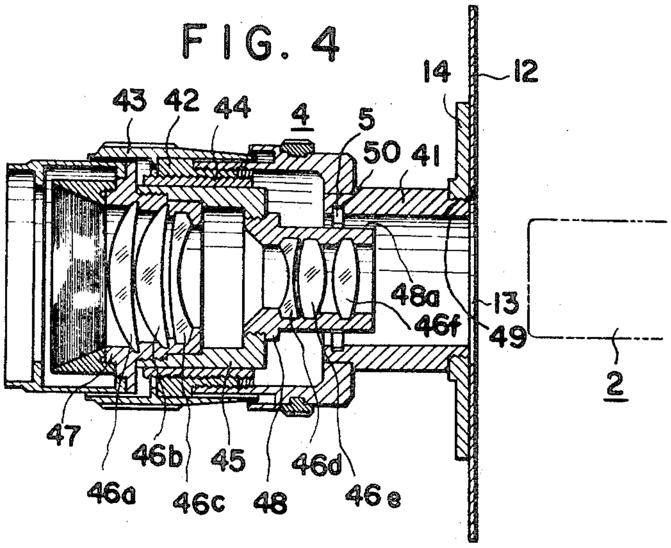
FIG. 4 is a vertical cross-section showing the objective lens of FIG. 1 as mounted on a television camera.

FIG. 4 shows an objective lens adapting the principles of the present invention. The objective lens 4 has a fitting tube 41 the connecting or coupling rear end portion 49 of which tube is conductively threaded into a receptacle or mating coupling member 14 of the front plate 12 of the shield case 11, the receptacle member 14 being formed to encircle the aperture 13 of the front plate 12 and conductively connected to the shield case 11 by way of the front plate member 12. The fore end portion of the fitting tube 41 is held in threaded engagement with rear portions of an outer helicoid ring member 42 which is securely fitted into a focusing ring 43. The inner periphery of the outer helicoid ring 42 is threaded for engagement with threads provided on the inner helicoid ring 44. The inner helicoid ring member 44 is securely fitted over an inner tube 45 which is integrally threaded over a front lens frame or sleeve 47. The front lens frame 47 securely supports thereon the front lens group consisting of a first lens 46*a*, a second lens 46*b* and a third lens 46*c*. The inner tube 45 is integrally threaded at the rear end thereof over a rear lens frame or sleeve 48 which securely supports thereon the rear lens group consisting of a fourth lens 46*d*, a fifth lens 46*e* and a sixth lens 46*f*. These fitting tube 41, outer helicoid ring 42, inner helicoid ring 44, front lens frame 47, rear lens frame 48 and inner tube 45 are all formed from an aluminum alloy and their surfaces are covered with oxidation films resulting from alumite treatment. Even where these component parts of the objective lens are formed from other metal, they are in most cases subjected to an oxidation film forming process.

Therefore, the front lens frame 47, inner tube 45 and rear lens frame 48 which are within the radiation angle extending from the photoelectric surface 24 of the vidicon tube 2 through the aperture 13 have low conductivity with respect to the fitting tube 41 and are not maintained at the same potential as the front plate member 12, acting as a stray capacity on photoelectric surface 24 of the vidicon tube 2. Especially, the rear lens frame 48 which is positioned closest to the photoelectric surface 24 exercises the most serious influences.

However, according to the present invention, the threaded connecting portion 49 of the fitting tube 41 has no oxidation films thereon and is conductively connected to the receptacle member 14 of the front plate 12, while the fitting tube 41 has formed on the inner periphery close to the fore end thereof with an annular groove 50 for receiving a resilient ring member 5 of highly conductive material such as phosphor bronze which is fitted over the outer periphery of the rear lens frame 48. The surfaces of the annular groove 50 and the rear lens frame 48 are formed to ensure high conductivity in the connection therebetween by way of the resilient ring member 5.

With the above construction, when the rear lens frame 48 is moved toward and away from the fitting tube 41 along the optical axis of the lens, both of the fitting tube and the rear lens frame are maintained constantly in a highly conductive interconnected state and at the same potential. More particularly, the rear lens frame 48 and the shield case 11 are maintained at the same potential, in the same menner as when the switch 8 is completed in FIG. 2.

Figure 5:
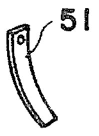
FIG. 5 is a perspective view showing a resilient member of conductive metallic material employed in the present invention.
Figure 6:
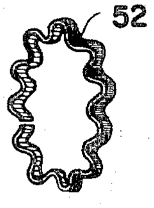
FIG. 6 is a perspective view showing a modified structure of the resilient member.
Figure 7:
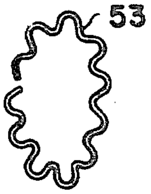
FIG. 7 is a perspective view showing another modified structure of the resilient member.

The resilient metal ring 5 is formed from an elongated strip 51 as shown in FIG. 5 with one side thereof secured either to the fitting tube or the rear lens frame by a suitable means such as a pin. The other side of the resilient ring member 51 is slidably held in sliding contact with either the fitting tube or the lens frame. This resilient ring member 51 may be provided in plural number. Furthermore, the resilient ring member 5 may be formed in a wavy or radially undulate 52 form as shown in FIG. 6 for interposition between the fitting tube 41 and the rear lens frame 48. In such a case, the ring member 52 may be riveted to the fitting tube 41 or the lens frame at suitable positions on the periphery of the ring member 52. Otherwise, it may be possible to provide an annular groove 50 on the inner periphery of the fitting tube 41 for receiving the wavy ring member 50 as shown in FIG. 4 in contact with the outer side or ridge portions thereof. The resilient ring member may be formed from a wire of a wavy ring shape 53 as shown in FIG. 7.

Figure 8:
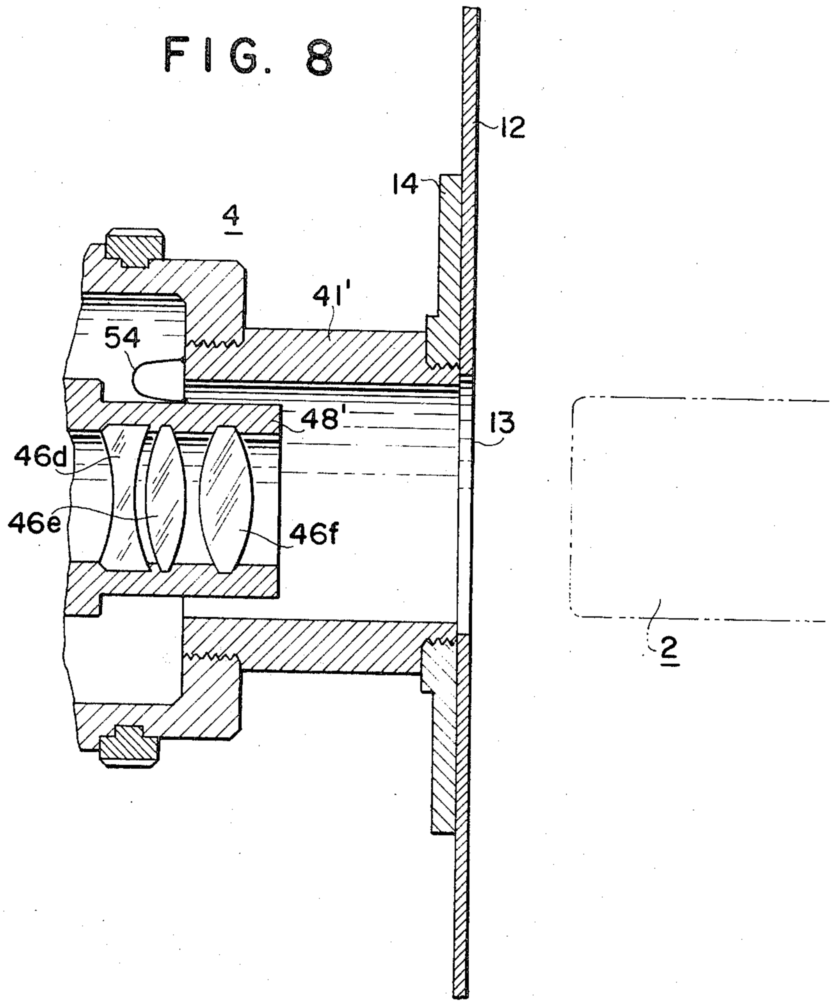
FIG. 8 is a partially vertical cross-section of the other embodiment of the present invention.

Moreover, in the embodiment of the invention shown in FIG. 8 flexible conductor wire 54 both ends of which are respectively fixed to fitting tube 41' and rear lens frame 48' and electrically connected can be used as one electrically conducting member. In this case, groove 50 as shwon in FIG. 4 is not required to be formed on the inside of fitting tube 41' or on the outside of rear lens frame 48'.

However, rear lens frame 48' is movable for adjusting the focus relative to fitting tube 41'so that the length of said flexible conductor wire 54 is required to be longer than the movable length of rear lens frame 48' relative to fitting tube 41 for adjusting said focus, and flexible conductor wire 54 is required to be fixed to rear lens frame 48' in a position not to permit its entry into the aperture of rear lens frame 48' when loosened.

To summarizer, the present invention resides in the improvement in the electric conductivity between the lens frame and the fitting tube of the objective lens by the use of a resilient member of a highly conductive metallic material. The foregoing is considered as illustrative only of the principles of the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

We claim:

1. An objective lens for a television camera including a receptacle comprising:

a fitting tube having a connecting portion for conductively connecting said objective lens to said receptacle portion of the television camera;

a conductive surface formed on the inner periphery of said fitting tube;

a lens frame composed of at least one tube for supporting a plurality of lenses movable along the optical axis of the lens with respect to said fitting tube and having a conductive surface formed on the outer periphery of one tube of said lens frame located close to the television camera and an electrically conductive member for connecting said conductive surfaces of said fitting tube and said tube constantly irrespective of the movement of the lens frame along the optical axis of the objective lens.

2. An objective lens for a television camera as set forth in claim 1, wherein said electrically conductive member has a length longer than the length along which the closest tube to the television camera of said lens frame moves for adjusting the focus relative to said fitting tube, and both ends of said electrically conductive member are respectively fixed to the fitting tube and said tube of said lens frame to electrically conduct.

3. An objective lens for a television camera as set forth in claim 1 wherein said electrically conductive member is composed of a resilient member of highly conductive metallic material.

4. An objective lens for a television camera as set forth in claim 3, further comprising:

a front lens frame for supporting a front lens group;

a rear lens frame for supporting a rear lens group;

an inner tube integrally connecting said front and rear lens frames and movable with respect to the fitting tube for focusing along the optical axis of the objective lens; and said conductive surface formed on the outer periphery fo said lens frame being formed on the outer periphery of said rear lens frame and extending along the optical axis of the objective lens.

5. An objective lens for a television camera as set forth in claim 3, wherein said resilient member is formed from a metal strip, with one side thereof conductively riveted to the inner periphery of said fitting tube and the other side being slidably contacting the conductive surface formed on the outer periphery of said lens frame constantly irrespective of the axial position of the lens frame.

6. An objective lens for a television camera as set forth in claim 3, wherein aid resilient member is formed from a metal strip, with one side thereof being conductively riveted to the outer periphery of the lens frame and the other side being slidable on the conductive surface formed on the inner periphery of said fitting tube irrespective of the axial position of said lens frame with respect to said fitting tube.

7. An objective lens for a television camera as set forth in claim 3, wherein said resilient member is formed from a strip of highly conductive metal of a wavy ring shape with the ridges of the waves extending in radial directions, the resilient member being interposed between said fitting tube and lens frame in contact with the conductive surfaces thereof.

8. An objective lens for a television camera as set forth in claim 3, wherein said resilient member is formed from a wire of highly conductive metal of a wavy ring shape with the ridges of the waves extending in radial directions, the resilient member being interposed between said fitting tube and lens frame in contact with the conductive surfaces thereof.

9. An objective lens for a television camera as set forth in claim 3, wherein:

an annular groove is formed on the inner periphery of said fitting tube and has a conductive surface, and further comprising a resilient ring of a highly conductive metal in the form of a wavy ring with the ridges and grooves thereof extended in radial directions, the ridges of the waves being fitted into said annular groove and the grooves of the waves being held in sliding contact with the conductive surface on said lens frame.

10. An objective lens for a television camera including an objective lens first coupling member comprising:

a tubular barrel member including at its rear end a second coupling member mating said first coupling in a highly conductive electrical connection therewith and having a first highly conductive peripheral face;

a tubular sleeve member axially slideable within said barrel member and having a second highly electrically conductive peripheral face radially spaced from said conductive peripheral face, the conductive peripheral face of at least one of said peripheral members being exposed to the other peripheral member; and means for electrically connecting said conductive peripheral faces to maintain them at an equipotential with said connected coupling members including a brush member electrically connected between said conductive peripheral surfaces and slideably engaging at least one of said conductive peripheral surfaces.

11. The objective lens of claim 10 wherein said brush member comprises a resilient metal strip having one end affixed to one of said tubular members and connected to the conductive peripheral face thereof and its other end free and biased toward and slideably bearing on the other conductive peripheral face.

12. The objective lens of claim 10 wherein said conductive peripheral faces are exposed to and confront each other and said brush member comprises a radially undulate resilient metal ring sandwiched between and slideably engaging said conductive peripheral faces.

* * * * *